United States Patent
Narasimhan et al.

(10) Patent No.: US 7,382,120 B2
(45) Date of Patent: Jun. 3, 2008

(54) ROTARY POSITION SENSOR WITH RECTANGULAR MAGNET AND HALL SENSORS PLACED IN ASSOCIATION WITH THE SURFACE OF THE MAGNET

(75) Inventors: Kumaran S. Narasimhan, Bangalore (IN); Vivek Salunke, Bangalore (IN); Swapnil Patil, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/412,386

(22) Filed: Apr. 26, 2006

(65) Prior Publication Data

US 2007/0252585 A1    Nov. 1, 2007

(51) Int. Cl.
*G01B 7/30* (2006.01)
(52) U.S. Cl. .............................. 324/207.25; 324/207.2
(58) Field of Classification Search ............ 324/207.2, 324/207.21, 207.25
See application file for complete search history.

(56) References Cited

U.S. PATENT DOCUMENTS

| | | | | |
|---|---|---|---|---|
| 4,760,285 A | | 7/1988 | Nelson | 307/309 |
| 5,157,329 A | * | 10/1992 | Brauer | 324/207.25 |
| 5,159,268 A | | 10/1992 | Wu | 324/207.2 |
| 5,323,075 A | | 6/1994 | Denk et al. | 310/68 B |
| 5,572,058 A | | 11/1996 | Biard | 257/421 |
| 6,486,764 B2 | | 11/2002 | Byram | 336/110 |
| 6,492,697 B1 | | 12/2002 | Plagens et al. | 257/426 |
| 6,501,263 B1 | | 12/2002 | Nyce | 324/207.13 |
| 6,703,827 B1 | * | 3/2004 | Wolf et al. | 324/207.12 |
| 6,707,292 B2 | | 3/2004 | Viola | 324/207.2 |
| 6,707,293 B2 | | 3/2004 | Wan et al. | 324/207.25 |
| 6,759,843 B2 | | 7/2004 | Furlong | 324/207.2 |
| 6,777,926 B2 | | 8/2004 | Johnson | 324/174 |
| 6,809,513 B2 | | 10/2004 | Terui et al. | 324/207.25 |
| 2004/0032251 A1 | * | 2/2004 | Zimmerman et al. | 324/207.13 |
| 2005/0088170 A1 | | 4/2005 | Steele et al. | |
| 2006/0176050 A1 | * | 8/2006 | LaPlaca | 324/207.25 |

FOREIGN PATENT DOCUMENTS

| | | |
|---|---|---|
| EP | 0575971 A1 | 12/1993 |
| GB | 2328752 A | 3/1999 |
| WO | WO 98/54547 | 12/1998 |

\* cited by examiner

*Primary Examiner*—Patrick Assouad
*Assistant Examiner*—David M. Schindler
(74) *Attorney, Agent, or Firm*—Kermit D. Lopez; Luis M. Ortiz (57) ABSTRACT

A rotary position sensor apparatus includes a magnet having a surface and a plurality of Hall components placed in association with the surface of the magnet. The Hall components are located on a neutral axis of the magnet thereby forming a rotary position sensor apparatus having an enhanced linearity, a reduced calibration time and a compact size. A printed circuit board (PCB) can also be provided and the Hall components mounted to the PCB. The magnet preferably possesses a rectangular shape, but other shapes may be implemented depending upon design considerations.

12 Claims, 9 Drawing Sheets

ROTARY POSITION SENSOR WITH RECTANGULAR MAGNET AND HALL SENSORS PLACED IN ASSOCIATION WITH THE SURFACE OF THE MAGNET

TECHNICAL FIELD

Embodiments are generally related to sensor systems and methods. Embodiments are also related to magnetic sensing systems and devices. Embodiments are additionally related to Hall Effect devices and rotary position sensors.

BACKGROUND

Magnetic sensing devices have many applications, including navigation, position sensing, current sensing, vehicle detection, and rotational displacement. There are many types of magnetic sensors, but essentially they all provide at least one output signal that represents the magnetic field sensed by the device. The Earth, magnets, and electrical currents can all generate magnetic fields. The sensor may be able to detect the presence, the strength, and/or the direction of the magnetic field. The strength of the magnetic field may be represented by a magnitude and a polarity (positive or negative). The direction of the magnetic field may be described by its angular position with respect to the sensor. One of the benefits of using magnetic sensors is that the output of the sensor is generated without the use of contacts. This is a benefit because over time contacts can degrade and cause system failures.

A Hall sensor is a type of magnetic sensor that uses the Hall Effect to detect a magnetic field. The Hall Effect occurs when a current-carrying conductor is placed into a magnetic field. A voltage is generated perpendicular to both the current and the field. The voltage is proportional to the strength of the magnetic field to which it is exposed. The current-carrying conductor is called a Hall element and it is typically composed of a semiconductor material.

One of the first practical applications of the Hall Effect was as a microwave power sensor in the 1950s. With the later development of the semiconductor industry and its increased ability for mass production, it became feasible to use Hall Effect components in high volume products. In 1968, Honeywell's MICRO SWITCH division produced a solid-state keyboard using the Hall Effect. The Hall Effect sensing element and its associated electronic circuit are often combined in a single integrated circuit.

In its simplest form, a Hall element can be constructed from a thin sheet of conductive material with output connections perpendicular to the direction of electrical current flow. When subjected to a magnetic field, the Hall Effect element responds with an output voltage that is proportional to the magnetic field strength. The combination of a Hall Effect element in association with its associated signal conditioning and amplifying electronics is sometimes called a Hall Effect transducer. Such Hall elements are typically implemented in the context of a Hall component or device such as a Hall chip.

BRIEF SUMMARY

The following summary is provided to facilitate an understanding of some of the innovative features unique to the embodiments and is not intended to be a full description. A full appreciation of the various aspects of the embodiments disclosed can be gained by taking the entire specification, claims, drawings, and abstract as a whole.

It is, therefore, one aspect of the present invention to provide for an improved rotary position sensor apparatus.

It is yet another aspect of the present invention to provide for a rotary position sensor apparatus based on the integration of one or more Hall components and a magnet.

It is a further aspect of the present invention to provide a rotary position sensor apparatus with a rectangular magnet and one or more Hall sensors located and/or placed in association with the surface of the magnet.

The aforementioned aspects of the Invention and other objectives and advantages can now be achieved as described herein. A rotary position sensor apparatus is disclosed, which includes a magnet having a surface and a plurality of Hall components located and/or placed in association with the surface of the magnet. The Hall components are located on a neutral axis of the magnet thereby forming a rotary position sensor apparatus having an enhanced linearity, a reduced calibration time and a compact size. A printed circuit board (PCB) can also be provided and the Hall components mounted to the PCB. The magnet preferably possesses a rectangular shape, but other shapes may be implemented depending upon design considerations.

The rotary sensor apparatus can thus be implemented based on a rectangular magnet and one or more Hall chips placed within the magnet surface. The Hall chips can be placed exactly on the neutral axis of the magnet leaving sufficient air gap above the magnet. The Hall chips are mounted on a PCB which is fixed firmly in a stationary location of the sensor apparatus. The rectangular magnet can be press fitted in a rotary part of the sensor apparatus revolved over the Hall chips. An extended linearity can be provided as the chip is placed within the magnet surface. Additionally, a zero calibration time results when the magnet is rectangular in shape. Also, a dual analog output can be generated by placing the chips equidistant from the geometric center of magnet. Finally, a compact size can be achieved with less undesirable effects due to the presence of external magnetic fields, because the Hall chips are placed within the magnet surface.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the principles of the disclosed embodiments.

DETAILED DESCRIPTION

The particular values and configurations discussed in these non-limiting examples can be varied and are cited merely to illustrate at least one embodiment and are not intended to limit the scope of the invention.

Figure 1:
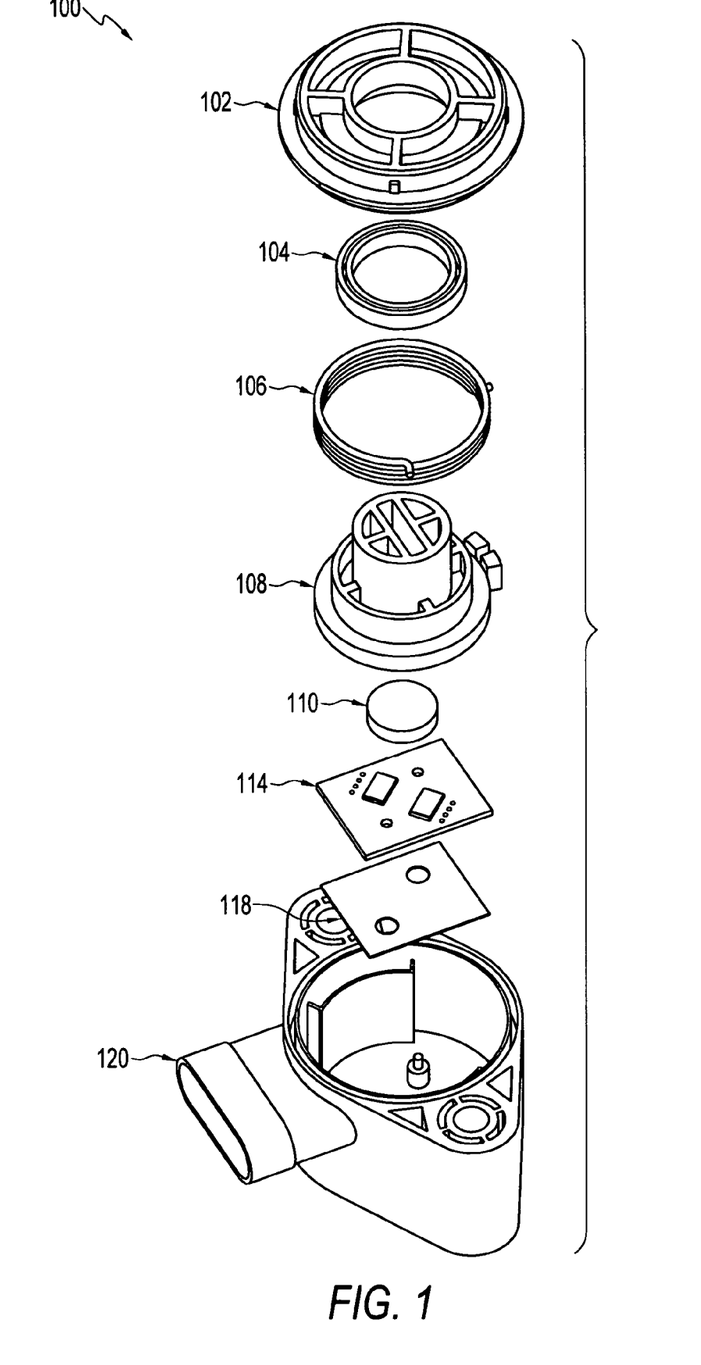
FIG. 1 illustrates an exploded view of a rotary position sensor apparatus, which can be implemented in accordance with a preferred embodiment.

FIG. 1 illustrates an exploded view of a rotary position sensor apparatus 100, which can be implemented in accordance with a preferred embodiment. The apparatus 100 generally includes a magnet 110, which is surrounded by a gasket 112 and located on a printed circuit board (PCB) 114. A housing 120 is provided, which maintains an EMI shield 118 below the PCB 114. A connector 116 permits the EMI shield 118 and the PCB 114 to be attached to the housing 120, thereby supporting the magnet 110. A rotor 108 surrounds the magnet 110. The rotor 108 is in turn supported by a torsion spring 106 and a sealing ring 104. A cover or cap 102 can be provided for maintaining the sealing ring 104, the torsion spring 106 and the rotor within housing 120.

Figure 2:
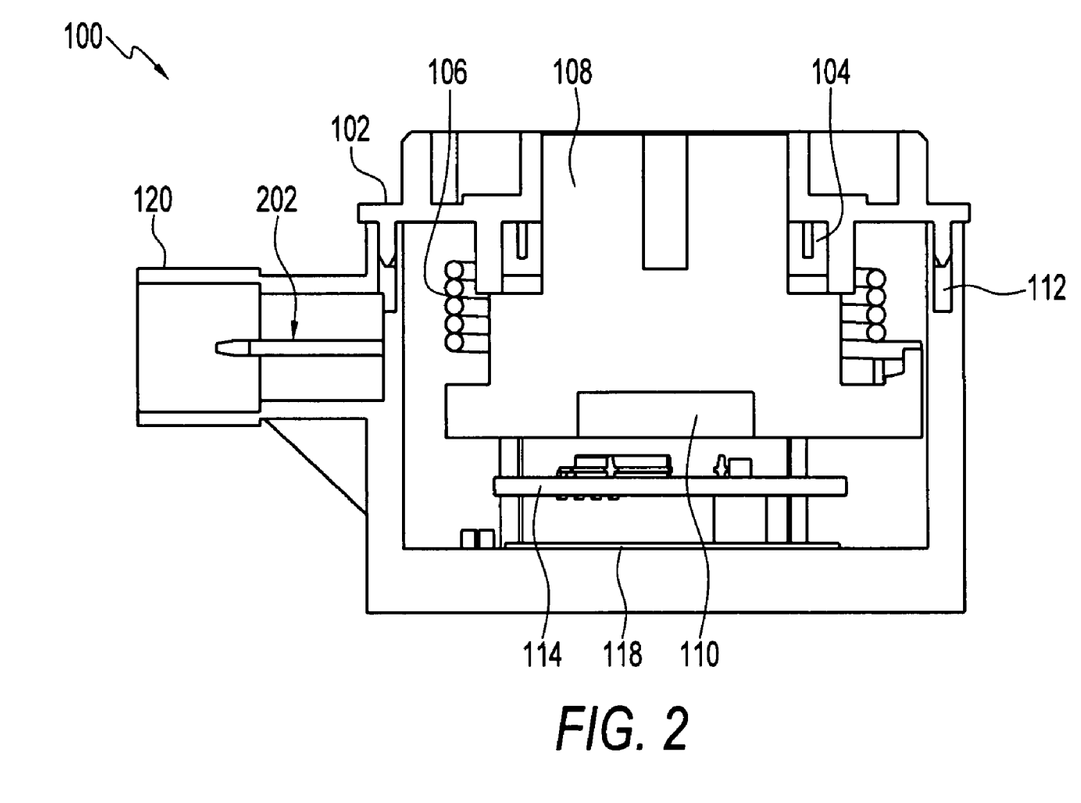
FIG. 2 illustrates a side sectional view of the rotary position sensor apparatus depicted in FIG. 1 in accordance with a preferred embodiment.

FIG. 2 illustrates a side-sectional view of the rotary position sensor apparatus 100 depicted in FIG. 1 in accordance with a preferred embodiment. Note that in FIGS. 1-2, identical or similar parts or elements are generally indicated by identical reference numerals. Thus, in addition to the components depicted in FIG. 1, the side-sectional view of apparatus 100 illustrated in FIG. 2 further illustrates terminals 202 disposed within housing 120.

Figure 3:
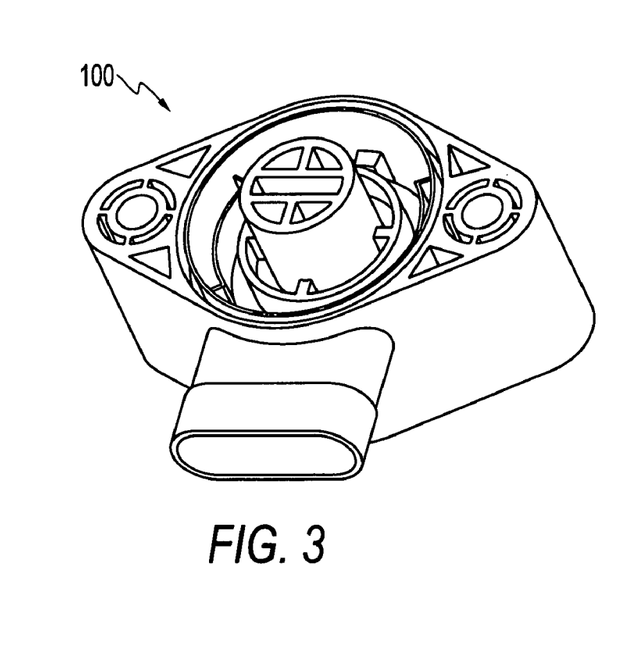
FIG. 3 illustrates a top view of the rotary position sensor apparatus depicted in FIGS. 1-2 in accordance with a preferred embodiment.
Figure 4:
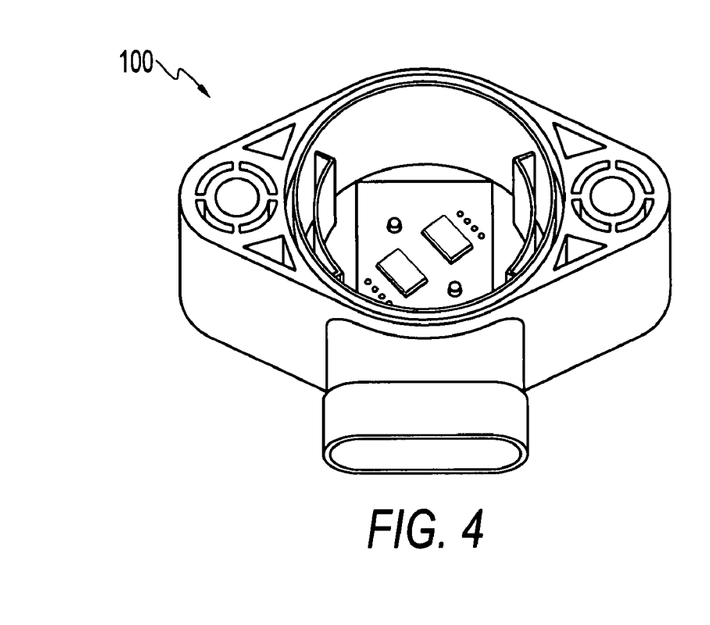
FIG. 4 illustrates a bottom view of the rotary position sensor apparatus depicted in FIGS. 1-2 in accordance with a preferred embodiment.

FIG. 3 illustrates a top view of the rotary position sensor apparatus 100 depicted in FIGS. 1-2 in accordance with a preferred embodiment. FIG. 4 illustrates a bottom view of the rotary position sensor apparatus 100 depicted in FIGS. 1-2 in accordance with a preferred embodiment. In FIGS. 1-4, identical or similar parts or elements are generally indicated by identical reference numerals.

Figure 5A:
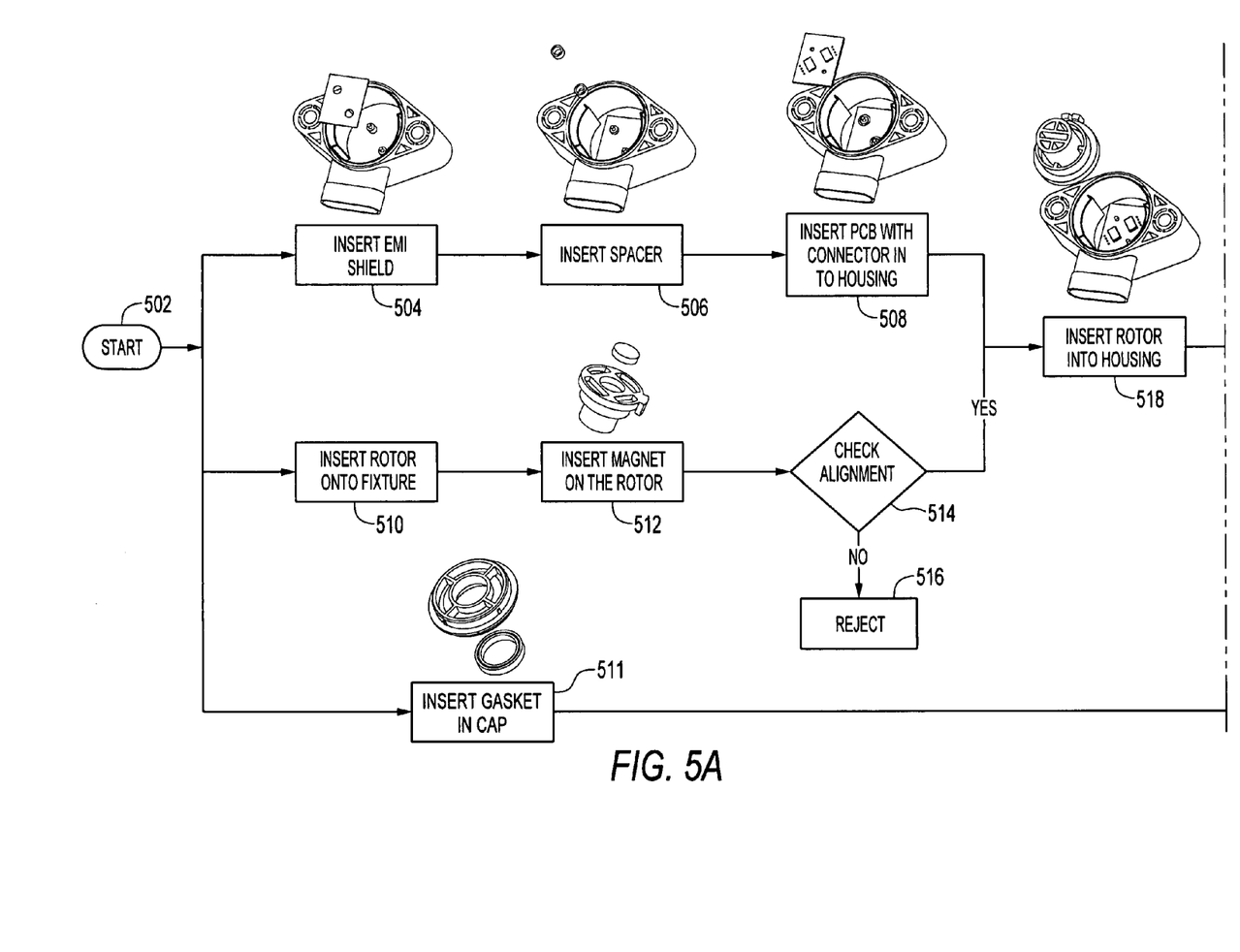
FIGS. 5A and 5B illustrates a flow chart of operations depicting logical operational steps, which may be processed for assembling the rotary position sensor apparatus depicted in FIGS. 1-4 in accordance with a preferred embodiment.
Figure 5B:
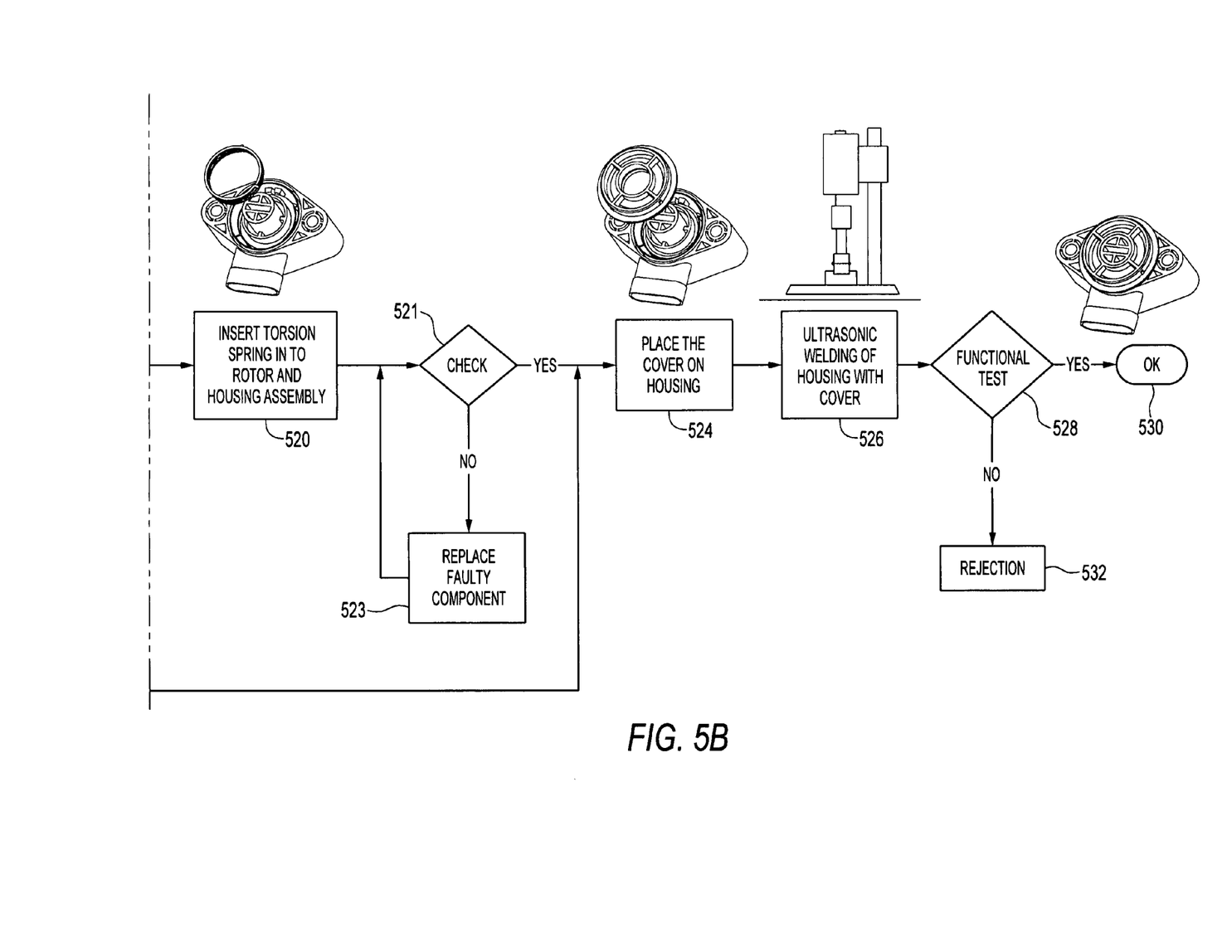

FIGS. 5A-5B illustrates a flow chart of operations depicting logical operational steps, which may be processed for assembling the rotary position sensor apparatus depicted in FIGS. 1-4 in accordance with a preferred embodiment. The method is initially depicted in FIG. 5A and continues as depicted in FIG. 5B. The assembly process can be initiated as indicated at block 502. Several operational paths can be performed simultaneously. The operations depicted at blocks 504, 506, and 508 can be implemented, while the operations illustrated at blocks 510, 512 514, 516 can be processed. Similarly, the operation described at block 511 can also be processed and so on. As indicated at block 510 the rotor 108 can be inserted onto a fixture. Next, as depicted at block 510, the magnet 110 can be inserted onto the rotor 108. A check alignment test can then be performed as depicted at block 514. If the test fails then the components are rejected as indicated at block 516. If the test succeeds, however, then the operation continues.

The operation illustrated at block 504 involves inserting the EMI shield 118 into the housing 120. Thereafter, as depicted at block 506, the PCB 114 can be inserted with the connector 116 into the housing 120. Next, as illustrated at block 508, the gasket 112 can be inserted into the housing 120. Following processing of the operations described at blocks 514 and/or 508, the operation depicted at block 58 can be processed in which the rotor 108 is inserted into the housing 120. Next, as Illustrated at block 520, the torsion spring 106 can be inserted into the rotor 108 and housing 120 (i.e., housing assembly). Thereafter, as depicted at block 521, a test can be performed to detect the assembled components. If the test fails, then the operation depicted at block 523 is processed. That is, the faulty component is replaced. If, however, the test depicted at block 521 is successful, then the cover 102 (e.g. cap) can be placed on the housing 120 as described at block 524. Note that the operation depicted at block 524 can also be processed following processing of the operation illustrated at block 511. Following processing of the operation depicted at block 524, the housing 120 can be ultrasonically welded to the cover 102 as depicted at block 526. A functional test can then be performed as indicated at block 528. If the test fails, then the entire device is rejected. If, however, the test is successful then the resulting assembled apparatus 100 is deemed fit, as indicated at block 530.

Figure 6:
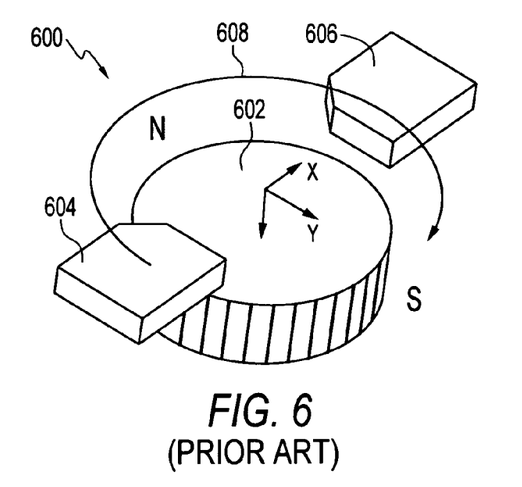
FIG. 6 illustrates a diagram of a prior art magnet configuration.
Figure 7:
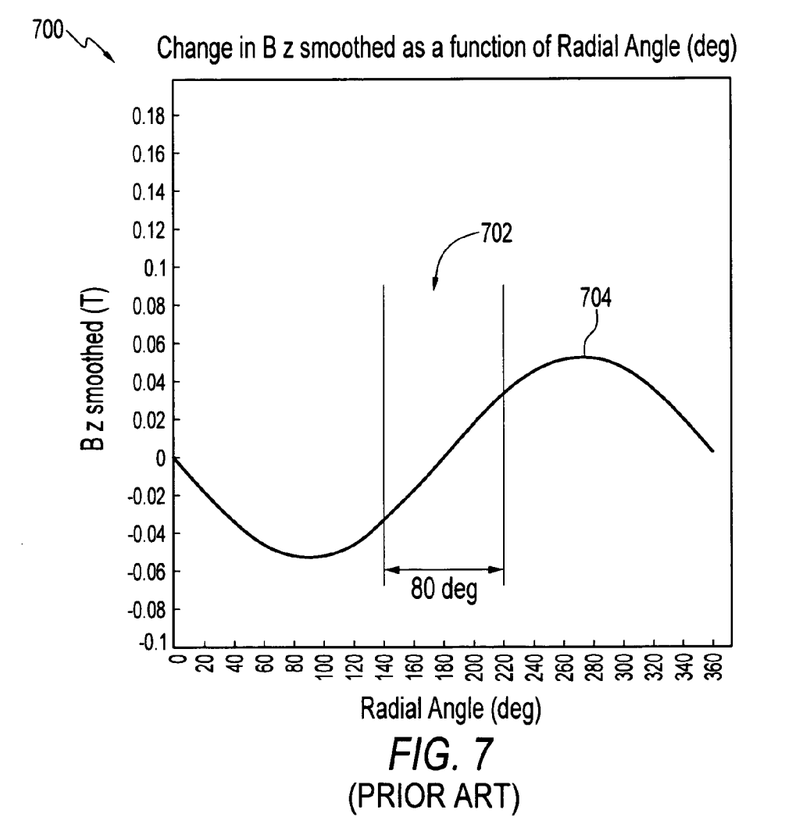
FIG. 7 illustrates a graph depicting a change $B_z$ smoothed as a function of a radial angle in accordance with the prior art magnet configuration depicted in FIG. 6.

FIG. 6 illustrates a diagram of a prior art magnet configuration 600. A magnet 602 of the configuration 600 is generally circular In shape. Two Hall components (e.g., Hall chips) 604, 606 are located above the magnet 602 opposite one another. Note that as utilized herein the term "Hall" can be utilized interchangeably with the term "Hall Effect." Hall components 604, 606 thus constitute Hall Effect devices or components (e.g., Hall Effect sensor). The linearity error for such a configuration is approximately 1.45% with offsets of 4.945 mm in X and 1.000 mm in Z. The diameter of the circular magnet can be, for example, 8.89 mm in "X" length with a 2.54 mm thickness. Arrow 608 depicted in FIG. 6 generally indicates the rotation of magnet 602. FIG. 7 illustrates a graph 700 depicting a change $B_z$ smoothed as a function of a radial angle in accordance with the prior art magnet configuration 600 depicted in FIG. 6. Graph 700 is thus associated with the configuration 600 Graph 700 indicates a region of interest 702 generally in an 80 degree range with respect to a plotted data curve 704.

Figure 8:
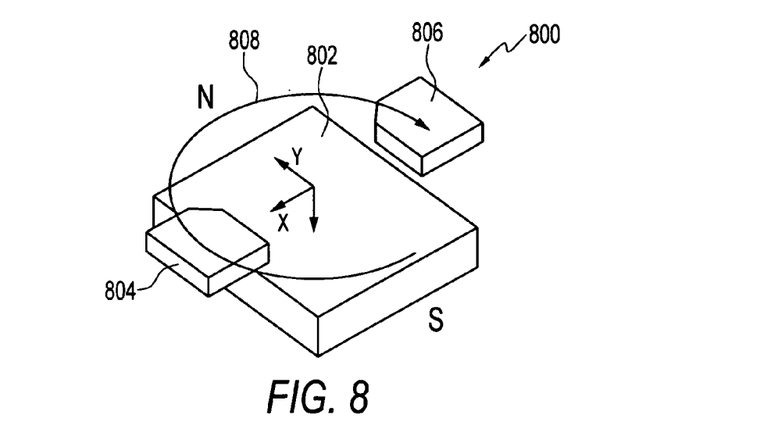
FIG. 8 illustrates a diagram of a proposed magnet configuration set up for avoiding alignment problems.

FIG. 8 illustrates a diagram of a proposed magnet configuration 800 setup to avoid alignment problems. The configuration 800 can be set up with a magnet 802 having a generally rectangular shape with respect to Hall components 804 and 806. Suggested parameters for magnet 802 are, for example, 10×12×2.54 mm. The rectangular shape of magnet 802 with respect to Hall Effect components 804 and 806 tends to avoid alignment problems. Arrow 808 generally indicates the rotation of configuration 800.

Figure 9:
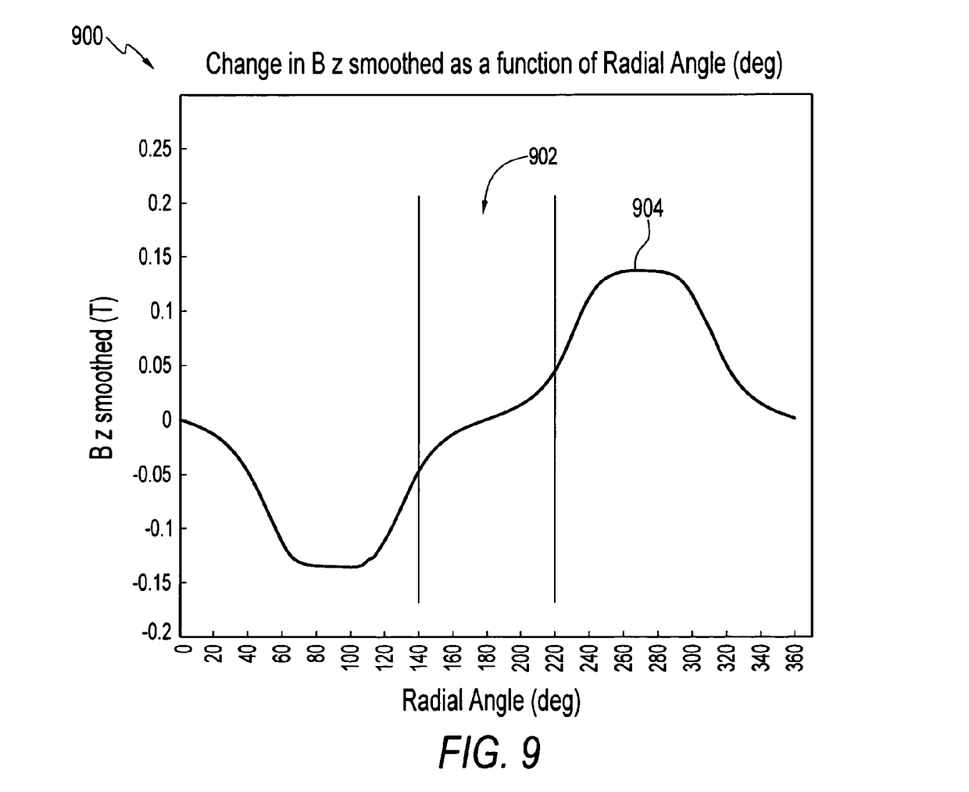
FIG. 9 illustrates a graph depicting a change $B_z$ smoothed as a function of a radial angle in accordance with the configuration depicted in FIG. 8.

FIG. 9 illustrates a graph 900 depicting a change $B_z$ smoothed as a function of a radial angle in accordance with the configuration 800 depicted in FIG. 8. A region of interest 904 is indicated in graph 900 with respect to a plotted curve 904. The data plotted in graph 900 is generally associated with the magnet configuration 800 depicted in FIG. 9. Because the region of interest 904 indicated in graph 900 is not acceptable, the configuration 800 is also not acceptable for rotary sensing purposes.

Figure 10:
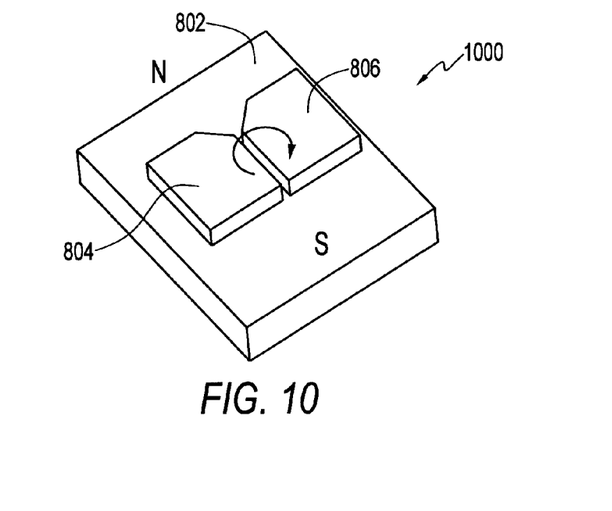
FIG. 10 illustrates a diagram of an improved magnet configuration, which can be implemented in accordance with a preferred embodiment.

FIG. 10 illustrates a diagram of an improved magnet configuration 1000, which can be implemented in accordance with a preferred embodiment. Note that in FIGS. 8 and 10, identical or similar parts or elements are generally indicated by identical reference numerals. In configuration 1000, the positions of Hall chips or Hall components 804 and 806 are modified with the same magnet 802. The Hall components 804, 806 are thus located and or placed in association with the surface of magnet 802. It can be appreciated that in some embodiments (not shown), the Hall chips 804 and 806 can be placed within the surface of magnet 802. The Hall components 804, 806 are located on a neutral axis of magnet 802, and forming and/or adapted for use with the rotary position sensor apparatus 100 discussed earlier. The resulting configuration 1000 for the rotary position sensor apparatus 100 provides an enhanced linearity, a reduced calibration time and a compact size.

Figure 11:
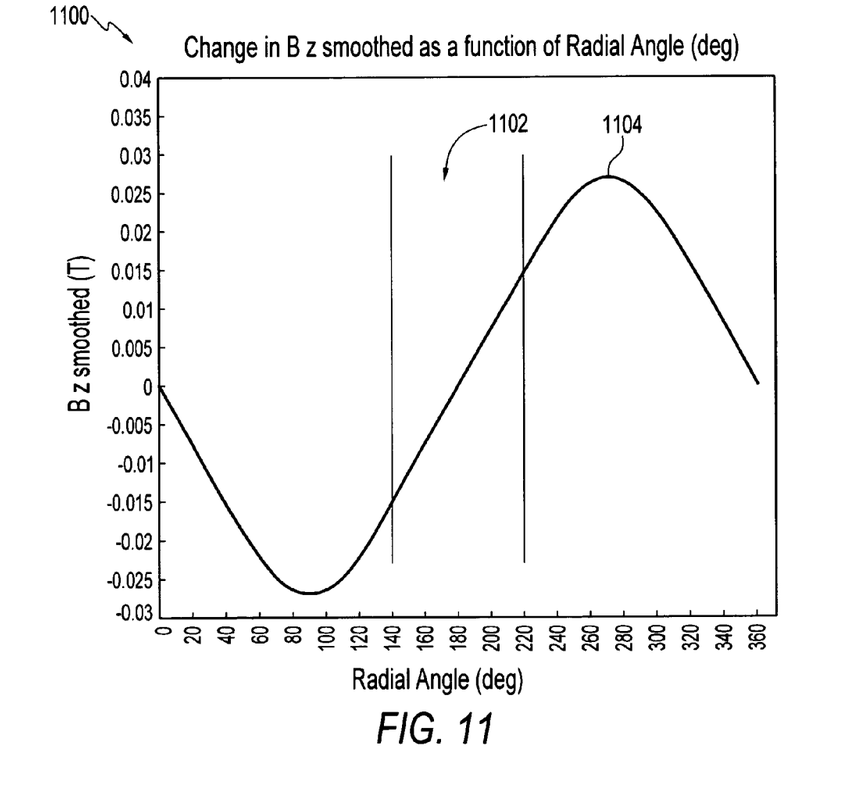
FIG. 11 illustrates a graph depicting a change $B_z$ smoothed as a function of a radial angle in accordance with a preferred embodiment depicted in FIG. 10.

FIG. 11 illustrates a graph 1100 depicting a change $B_z$ smoothed as a function of a radial angle in accordance with preferred alternative embodiment depicted in FIG. 10. Graph 1100 generally includes a region of interest 1102 with respect to a plotted data curve 1104. Graph 1100 indicates the linearity error can be reduced to 0.30 by moving the chips 804, 806 closer within the magnet 802 boundary, thereby reducing space requirements. Suggested parameters for magnet 802 are, for example, 10×12×2.54 mm.

The rotary sensor apparatus 100 described earlier can thus be implemented based on the use of the rectangular magnet 802 and one or more Hall chips 804, 806 located and/or placed in association with the surface of the magnet 802. It can be appreciated that in some embodiments (not shown), the Hall chips 804, and 806 can be placed exactly on the neutral axis of the magnet 802. The Hall chips 804, 806 can be placed exactly on the neutral axis of the magnet 802 leaving a sufficient air gap above the magnet 802. The Hall chips 804, 806 can be mounted on the PCB 114, which is fixed firmly in a stationary location of the overall sensor apparatus 100. The rectangular magnet 802 can be press fitted in a rotary part of the sensor apparatus revolved over the Hall chips 804, 806.

Figure 12:
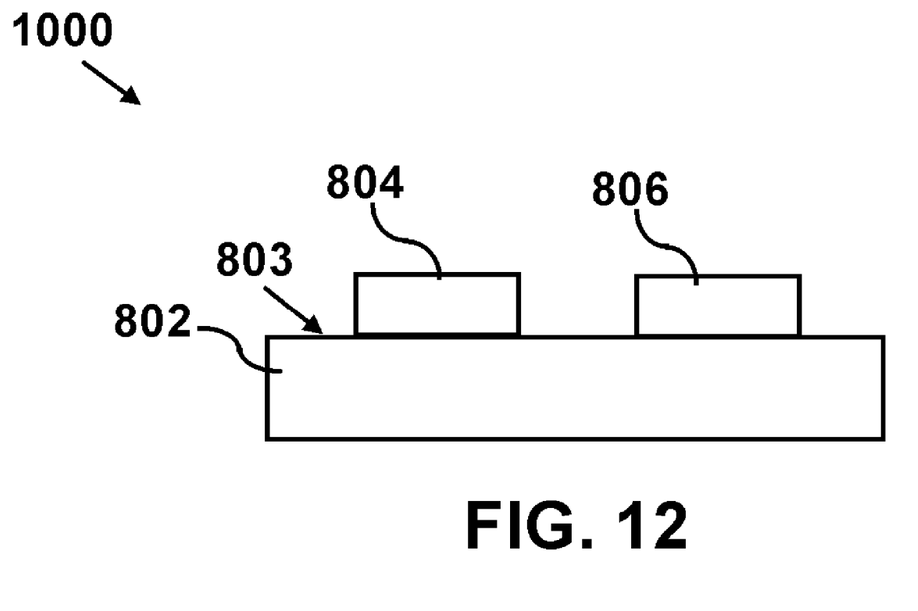
FIG. 12 illustrates a side view of the improved magnet configuration depicted in FIG. 10, in accordance with a preferred embodiment.

An extended linearity can be provided as the chips 804, 806 are placed within the surface of magnet 802. A zero calibration time results because the magnet 802 is rectangular in shape. Also, a dual analog output can be generated by placing the chips 804, 806 equidistant from the geometric center of the magnet 802. Finally, a compact size can be achieved with less undesirable effects due to the presence of external magnetic fields, because the Hall chips 804, 806 are placed within the magnet 802 surface 803 (see FIG. 12 for surface 803). In general, the configuration 1000 depicted in FIG. 10 can be implemented in place of magnet 110 depicted in FIG. 1 and can be utilized for a number of rotary sensing applications, such as, for example, non-contact rotary position sensing, throttle position devices, pedal accelerators, door position detection and steering position devices. Note that FIG. 12 illustrates a side view of the configuration 1000 depicted in FIG. 12. FIG. 12 demonstrates that the Hall components 804, 806 are located on the surface 803 of the magnet 802.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A rotary position sensor apparatus, comprising:
   a magnet having a surface thereon;
   a plurality of Hall components placed in association with said surface of said magnet, said plurality of Hall components located on said surface of said magnet;
   a printed circuit board, wherein said plurality of Hall components are mounted on said printed circuit board in association with a housing and a cap for maintaining said printed circuit board and said plurality of Hall components; and
   a rotor surrounded by a torsion spring and a sealing ring covered by said cap, said rotor surrounding said magnet, wherein said plurality of Hall components are located on a neutral axis of said magnet thereby forming said rotary position sensor apparatus with an enhanced linearity, a reduced calibration time and a compact size.

2. The apparatus of claim 1 wherein said magnet comprises a rectangular shape.

3. The apparatus of claim 1 wherein said housing is ultrasonically welded to said cap.

4. The apparatus of claim 1 wherein each Hall component among said plurality of Hall components are located equidistant from a geometric center of said magnet in order to generate a dual analog output signal indicative of rotary position data.

5. The apparatus of claim 1 wherein said magnet is press fitted on a rotary portion of said rotary position sensor apparatus.

6. A rotary position sensor apparatus, comprising:
   a magnet having a surface and a rectangular shape;
   a printed circuit board associated with said magnet;
   to a plurality of Hall components placed in association with and on said surface of said magnet and mounted on said printed circuit board; and
   a housing and a cap for maintaining said printed circuit board and said plurality of Hall components
   a rotor surrounded by a torsion spring and a sealing ring covered by said cap, said rotor surrounding said magnet, wherein said plurality of Hall components are located on a neutral axis of said magnet thereby forming said a rotary position sensor apparatus with an enhanced linearity, a reduced calibration time and a compact size.

7. The apparatus of claim 6 wherein each Hall component among said plurality of Hall components are located equidistant from a geometric center of said magnet in order to generate a dual analog output signal indicative of rotary position data.

8. The apparatus of claim 6 wherein said magnet is press fitted on a rotary portion of said rotary position sensor apparatus.

9. A method of forming a rotary position sensor apparatus, comprising:
   providing a magnet having a surface;
   configuring said magnet with a rectangular shape;
   placing a plurality of Hall components in association with and on said surface of said magnet;
   providing a printed circuit board;
   mounting said plurality of Hall components on said printed circuit board;
   providing a housing and a cap for maintaining said printed circuit board and said plurality of Hall components;
   providing a rotor surrounded by a torsion spring and a sealing ring covered by said cap, wherein said rotor surrounds said magnet and wherein said can maintains said sealing ring, said torsion spring and said rotor within said housing; and
   locating said plurality of Hall components on a neutral axis of said magnet in order to thereby form said rotary position sensor apparatus from said magnet and said plurality of Hall components, wherein said rotary position sensor apparatus possesses an enhanced linearity, a reduced calibration time and a compact size for rotary sensing applications.

10. The method of claim 9 wherein further comprising locating each Hall component among said plurality of Hall components equidistant from a geometric center of said magnet in order to generate a dual analog output signal indicative of rotary position data.

11. The method of claim 9 further comprising press fitting said magnet on a rotary portion of said rotary position sensor apparatus.

12. The method of claim 9 further comprising ultrasonically welding said housing to said cap.

* * * * *

UNITED STATES PATENT AND TRADEMARK OFFICE
CERTIFICATE OF CORRECTION

| | |
|---|---|
| PATENT NO. | : 7,382,120 B2 |
| APPLICATION NO. | : 11/412386 |
| DATED | : June 3, 2008 |
| INVENTOR(S) | : Kumaran S. Narashimhan et al. |

It is certified that error appears in the above-identified patent and that said Letters Patent is hereby corrected as shown below:

In Column 6, line 26, claim 6 delete "to";
In Column 6, line 61, claim 9 delete "can" and add --cap--.

Signed and Sealed this

Second Day of September, 2008

JON W. DUDAS
*Director of the United States Patent and Trademark Office*